Patented Feb. 27, 1951

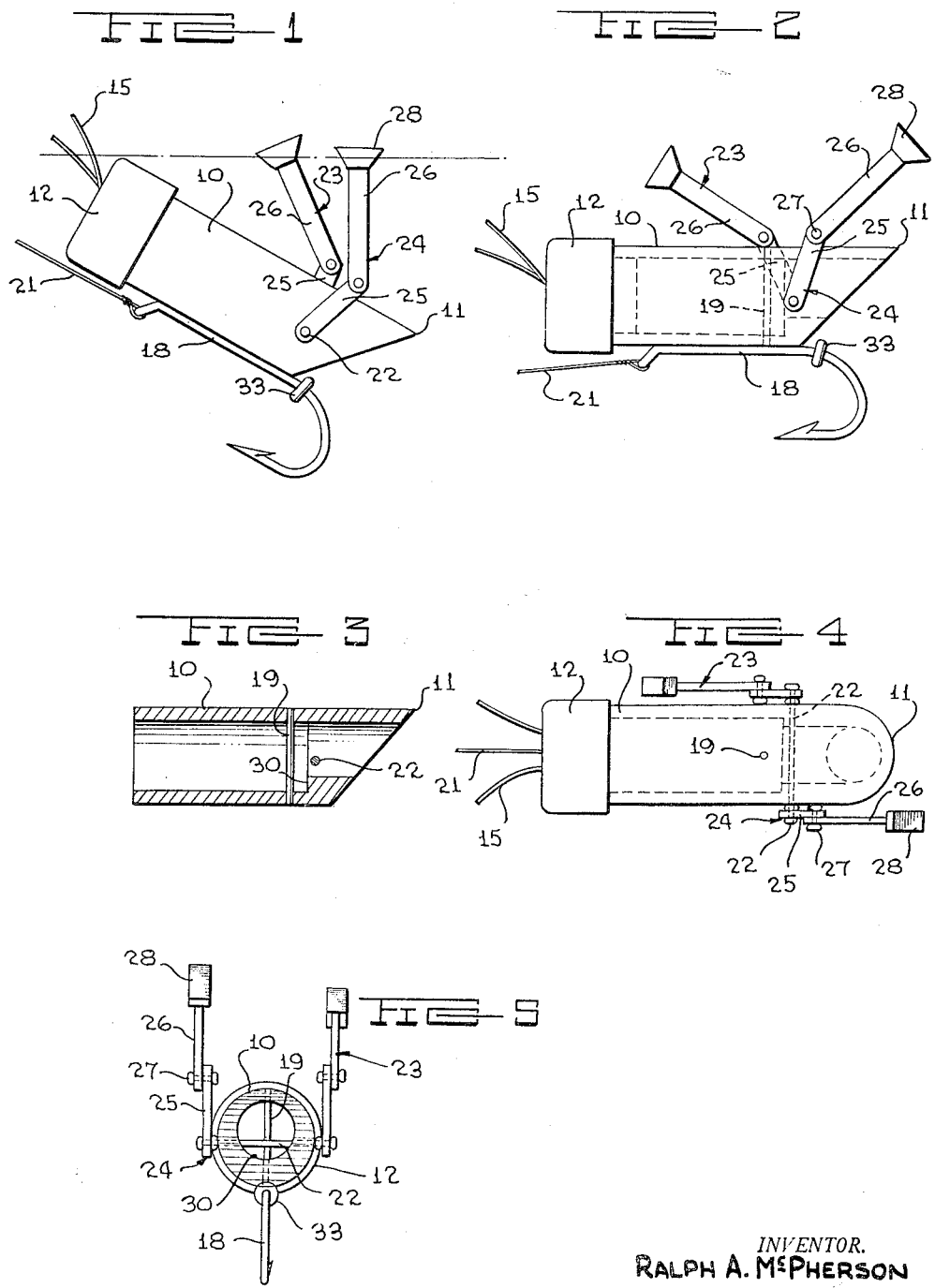

2,543,464

UNITED STATES PATENT OFFICE 2,543,464

SELF-ANIMATED ARTIFICIAL FISHING BAIT

Ralph A. McPherson, Greenfield, Ind.

Application December 23, 1948, Serial No. 66,897

2 Claims. (Cl. 43—42.06)

This invention relates to fish lures and more particularly to a self animated fish lure movable by the generation of gas therein while immersed in water.

It is among the objects of the invention to provide a fish lure closely simulating in appearance an insect or aquatic creature of a kind normally constituting food for the type of fish for which the lure is designed, and which is arranged to generate and discharge a gas when the lure is immersed in water in a manner to impart to the lure recurring movements closely approximating the movements of the creature simulated when such a creature is in water and which lure is highly attractive to several kinds of fish, particularly game fish, is strong, durable and waterproof in construction, economical to manufacture, neat and attractive in appearance, and will contain a sufficient quantity of gas generating material to maintain it in motion in the water for an extended time interval.

Other objects and advantages will become apparent from a consideration of the following description and the appended claims in conjunction with the accompanying drawing wherein:

Figure 1 is a side elevation of the lure in operative position in a body of water;

Figure 2 is a view similar to Figure 1 showing the lure in a different position;

Figure 3 is a longitudinal medial cross section of the body portion of the lure;

Figure 4 is a top plan view of the lure; and

Figure 5 is a rear elevational view of the lure.

With continued reference to the drawing, the lure comprises an elongated, tubular body 10 which is open at both ends. One end of the body 10 terminates in a plane substantially at right angles to the longitudinal center line of the tubular body and the other end terminates in a plane disposed at an acute angle to such longitudinal center line and provides at such end of the body an overhang or fantail 11. The side of the body 10 normally constituting the top of the lure is thus longer than the opposite side normally at the bottom of the lure.

A head 12 is secured in the end of the lure disposed at right angles to the longitudinal center line of the body 10 and may have decorations such as the antennae 15.

A conventional hook 18 is secured to the body 10 by a pin 19 secured in the body 10 adjacent the angularly disposed end of the body. An eye 20 is provided at one end of the hook for the attachment of a line 21 to the lure.

When the lure thus formed is placed in a body of water, it will assume the position illustrated in Figure 1, wherein the head 12 is substantially at the surface of the water and the angularly disposed end or fantail 11 of the body is below and substantially parallel to the water surface.

A pin 22 extends transversely through the body near the angularly disposed end of the latter and substantially midway between the longer top side and shorter bottom side of the body and a pair of legs 23 and 24 are pivotally mounted on the body by means of the pin 22.

Each of the legs 23 and 24 comprises two links, 25 and 26, disposed in end to end relationship and pivotally interconnected at their proximal ends by a pivot joint 27, and a foot 28 of buoyant material on the distal end of the link 26, this link being attached to the link 25 the distal end of which is pivotally connected to the corresponding end of pin 22 outside of the body 10. The two legs 23 and 24 are pivotally connected to respectively opposite ends of the pin 22 outside of the body 10 so that the legs are disposed at respectively opposite sides of the body. When the lure is immersed in water, as illustrated in Figure 1, the buoyant feet 29 have a tendency to float and to hold the legs in a substantially upright position in the water.

A portion of the wall of body 10 at the angularly disposed end of the body is made thicker than the remainder of the body wall and projects interiorly of the body to provide a stop 30 and provide an opening 31 of reduced size at this end of the body.

The space within the body 10 between the head 12 and the stop 30 provides a chamber for the reception of a piece of solid material of a composition which will produce gas when subjected to water. Any one of various well known compositions may be used for this purpose but it is highly desirable that the material produce gas at a relatively slow rate and that it should not dissolve rapidly.

With the lure in the position illustrated in Figure 1 with the body of gas producing material therein and subjected to water inside of the lure body 10, the body of material will generate gas which will flow to the open lower end of the lure, the upper end being closed by head 12. The gas so generated will accumulate in a bubble at the lower or angularly disposed end of the lure body which bubble will gradually increase in size until its buoyancy becomes sufficient to overcome the weight of this end of the lure, the bubble being held in place while increasing in size by the extension 11 on the upper side of the lure body. As soon as the buoyancy of the bubble becomes sufficient to overcome the weight of the lower end of the lure this end of the lure will be quickly elevated substantially to the position illustrated in Figure 2, whereupon the bubble will be released and the angularly disposed end of the lure will quickly drop back to the position illustrated in Figure 1. This action gives a lifelong kicking movement to the lure and, as the bubble is near the surface of the water when it breaks away from the lure, it will quickly reach the surface and break without causing any action disturbing or alarming to fish which might be attracted to the lure.

As soon as one bubble has been discharged and the lure returns to the original position, as illustrated in Figure 1, the body of gas-producing material will again generate gas to produce a subsequent bubble resulting in the same action of the lure. The lure will thus have a lifelike kicking movement at periodic intervals which renders it highly deceptive to fish.

If desired, a weight 33 may be mounted on the hook near the open end of the body 10 to assist in holding the body in proper position in the water.

The links 25 and 26 of the legs may be formed of either a buoyant or non-buoyant material and, if formed of a buoyant material the buoyant feet 29 may be omitted, if desired.

The lure may be formed in various sizes and shapes and variously decorated for different fishing conditions.

While a certain specific embodiment of this invention has been shown it will be understood that various modifications may be made within the spirit of the invention. Therefore no limitations on the invention are intended other than are imposed by the scope of the appended claims.

I claim:

1. A fish lure comprising a generally tubular body open at one end and having said one end terminating in a plane disposed at an acute angle to the longitudinal center line of the body so that one side of said body is longer than the other, a head closing the other end of said body, a hook secured to said body on the shorter side and near the angularly disposed end so that, when said lure is placed in water it will float with said head substantially at the surface of the water and said angularly disposed end below and substantially parallel to the water surface, said body having a pair of legs pivotally connected at corresponding ends to said body at respectively opposite sides of the latter, each of said legs comprising two members disposed in end to end relationship and pivotally interconnected at their proximal ends, and a buoyant foot on the distal end of the members alternative to the one whose distal end is pivotally connected to said body, the space within said body constituting a chamber for receiving a body of solid material which when subjected to water in said body produces bubbles which gradually increase under the angularly disposed end of said body and suddenly break away imparting a kicking movement to the angularly disposed end of said body and to said legs, and means in said body near the open end thereof for retaining a body of solid material in said body.

2. A fish lure comprising an elongated tubular body having one end open and terminating in a plane disposed at an acute angle to the longitudinal center line of said body, a head at the opposite end of said body, a pair of jointed legs pivotally conected to said body adjacent said one end and at respectively opposite sides of the latter, a buoyant foot at the distal end of each leg, and a hook secured to said body adjacent said one end and in position such that when said body is in water it will float with said head substantially at the surface of the water and said one end below and substantially parallel to the water surface, the interior of said body constituting a chamber for the reception of a body of material of a composition which will generate gas when subjected to water, and the angularly disposed end of said body constituting a fantail for accumulating such gas into bubbles which will lift the angularly disposed end of said body and break away as their buoyancy exceeds the weight of such angularly disposed end.

RALPH A. McPHERSON.

REFERENCES CITED

The following references are of record in the file of this patent:

UNITED STATES PATENTS

| Number | Name | Date |
|---|---|---|
| 1,612,794 | Bender | Jan. 4, 1927 |
| 2,047,768 | Christiansen | July 14, 1936 |
| 2,055,841 | Haislip | Sept. 29, 1936 |
| 2,091,457 | Sauer | Aug. 31, 1937 |
| 2,234,077 | Hayley Jr. | Mar. 4, 1941 |
| 2,235,331 | Pugh | Mar. 18, 1941 |
| 2,256,813 | Mikina | Sept. 23, 1941 |
| 2,415,742 | Hiltabidel et al. | Feb. 11, 1947 |
| 2,445,523 | Goldbach | July 20, 1948 |